US011199128B2

(12) United States Patent
Brinkert et al.

(10) Patent No.: US 11,199,128 B2
(45) Date of Patent: Dec. 14, 2021

(54) INTERNAL COMBUSTION ENGINE FOR A MOTOR VEHICLE AND MOTOR VEHICLE HAVING SUCH AN INTERNAL COMBUSTION ENGINE

(71) Applicant: Daimler AG, Stuttgart (DE)

(72) Inventors: Nils Brinkert, Ludwigsburg (DE); Torsten Hirth, Rutesheim (DE); Siegfried Weber, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/755,462

(22) PCT Filed: Sep. 21, 2018

(86) PCT No.: PCT/EP2018/075620
§ 371 (c)(1),
(2) Date: Apr. 10, 2020

(87) PCT Pub. No.: WO2019/072521
PCT Pub. Date: Apr. 18, 2019

(65) Prior Publication Data
US 2020/0240322 A1 Jul. 30, 2020

(30) Foreign Application Priority Data

Oct. 11, 2017 (DE) .................... 10 2017 009 452.7

(51) Int. Cl.
*F02B 37/02* (2006.01)
*F02B 37/18* (2006.01)
(Continued)

(52) U.S. Cl.
CPC .......... *F02B 37/025* (2013.01); *F01D 17/141* (2013.01); *F01D 17/18* (2013.01);
(Continued)

(58) Field of Classification Search
CPC ...... F02B 37/18; F02B 37/183; F02B 37/186; F02B 37/025; F02D 23/00; F01D 17/141;
(Continued)

(56) References Cited

U.S. PATENT DOCUMENTS 1,529,632 A * 3/1925 Nagler ...................... F03B 1/00
415/165
3,322,153 A * 5/1967 Rankin ................... F01D 17/18
137/630.19
(Continued)

FOREIGN PATENT DOCUMENTS

DE        10132672 A1 *  1/2003 ............ F02B 37/025
DE      101 52 803 A1     5/2003
(Continued)

OTHER PUBLICATIONS

An English machine translation to Schmid et al. (Pub. No. DE 10 2005 032 002 A1), published on Jan. 18, 2007.*
(Continued)

*Primary Examiner* — Thai Ba Trieu
(74) *Attorney, Agent, or Firm* — Crowell & Moring LLP (57) ABSTRACT

An internal combustion engine has first and second combustion chambers, first and second exhaust gas line elements, and an exhaust gas turbocharger which has a first flood, a second flood, and a third flood. A bypass device has a bypass line that can be flowed through by exhaust gas from the first and second exhaust gas line elements and via the bypass line a turbine wheel is bypassed by a first part of the exhaust gas from the first and second exhaust gas line elements. A valve device includes a first valve element, via which an amount of the exhaust gas flowing through the bypass line and bypassing the turbine wheel from the first and second exhaust gas line elements is settable. A third exhaust gas line element opens out into the third flood.

7 Claims, 2 Drawing Sheets

(51) Int. Cl.
*F02D 23/00* (2006.01)
*F01D 17/14* (2006.01)
*F01D 17/18* (2006.01)
*F01N 13/10* (2010.01)
*F16K 11/065* (2006.01)

(52) U.S. Cl.
CPC .......... *F01N 13/107* (2013.01); *F02B 37/183* (2013.01); *F02D 23/00* (2013.01); *F16K 11/065* (2013.01); *F05D 2220/40* (2013.01)

(58) Field of Classification Search
CPC ...... F01D 17/18; F01N 13/107; F16K 11/065; F05D 2220/40
USPC .......................................... 60/602; 137/625.47
See application file for complete search history.

(56) References Cited

U.S. PATENT DOCUMENTS

| | | | | |
|---|---|---|---|---|
| 3,763,894 | A * | 10/1973 | Meyer | F01D 17/18 137/630.19 |
| 4,008,010 | A * | 2/1977 | Fauconnet | F03B 3/10 415/205 |
| 4,388,845 | A | 6/1983 | Koike | |
| 4,456,032 | A * | 6/1984 | Straslicka | F01D 17/18 137/630.19 |
| 6,260,358 | B1 * | 7/2001 | Daudel | F02D 23/00 60/602 |
| 6,694,735 | B2 | 2/2004 | Sumser et al. | |
| 7,047,739 | B2 * | 5/2006 | Fledersbacher | F02B 37/025 60/602 |
| 7,051,527 | B2 * | 5/2006 | Schmid | F02B 37/183 60/602 |
| 7,428,813 | B2 * | 9/2008 | Finger | F02B 37/183 60/602 |
| 7,637,106 | B2 | 12/2009 | Hertweck et al. | |
| 8,621,863 | B2 * | 1/2014 | Kratschrner | F02B 37/025 60/602 |
| 8,984,880 | B2 * | 3/2015 | Marques | F02B 37/183 60/602 |
| 8,997,485 | B2 * | 4/2015 | Sumser | F01D 17/143 60/602 |
| 9,010,109 | B2 * | 4/2015 | Marques | F02B 37/183 60/602 |
| 9,021,803 | B2 * | 5/2015 | Hirth | F01D 17/141 60/602 |
| 9,097,173 | B2 * | 8/2015 | Kuhn | F02B 37/025 |
| 9,267,418 | B2 * | 2/2016 | Challand | F02B 37/025 |
| 9,291,092 | B2 * | 3/2016 | Sumser | F01D 17/141 |
| 9,752,537 | B2 * | 9/2017 | Dale | F02B 37/025 |
| 2010/0024414 | A1 | 2/2010 | Hittle et al. | |
| 2010/0037856 | A1 | 2/2010 | Dickerson et al. | |
| 2011/0067397 | A1 * | 3/2011 | Hirth | F02B 37/18 60/602 |
| 2012/0312010 | A1 * | 12/2012 | Yasoshima | F02B 37/183 60/602 |
| 2013/0047606 | A1 * | 2/2013 | Kuhn | F02B 37/025 |
| 2019/0078504 | A1 * | 3/2019 | Yoshida | F02B 37/183 |
| 2019/0301356 | A1 * | 10/2019 | Haaland | F02B 37/025 |
| 2020/0256242 | A1 * | 8/2020 | Roth | F02B 37/183 |

FOREIGN PATENT DOCUMENTS

| | | | | |
|---|---|---|---|---|
| DE | 10 2004 055 571 | A1 | 6/2006 | |
| DE | 102004062091 | A1 * | 7/2006 | ............ F02B 37/025 |
| DE | 10 2005 032 002 | A1 | 1/2007 | |
| DE | 10 2007 025 437 | A1 | 12/2008 | |
| DE | 10 2008 020 405 | A1 | 10/2009 | |
| DE | 102009012131 | A1 * | 9/2010 | ........... F01D 17/141 |
| DE | 10 2009 020 625 | A1 | 11/2010 | |
| DE | 10 2013 002 894 | A1 | 9/2014 | |
| DE | 10 2016 208 159 | A1 | 11/2017 | |

OTHER PUBLICATIONS

PCT/EP2018/075620, International Search Report dated Nov. 15, 2018 (Three (3) pages).
German Search Report issued in German application No. 10 2017 009 452.7 dated Aug. 1, 2018, with Statement of Relevancy (Eight (8) pages).

* cited by examiner

INTERNAL COMBUSTION ENGINE FOR A MOTOR VEHICLE AND MOTOR VEHICLE HAVING SUCH AN INTERNAL COMBUSTION ENGINE

BACKGROUND AND SUMMARY OF THE INVENTION

The invention relates to an internal combustion engine for a motor vehicle. The invention furthermore relates to a motor vehicle having such an internal combustion engine.

Such an internal combustion engine for a motor vehicle is already known from DE 10 2004 055 571 A1, for example. The internal combustion engine has at least one first combustion chamber, at least one second combustion chamber and at least one first exhaust gas line element that can be flowed through by exhaust gas from the first combustion chamber. Moreover, the internal combustion chamber has at least one second exhaust gas line element, which can be flowed through by exhaust gas from the second combustion chamber. Furthermore, the internal combustion engine comprises at least one exhaust gas turbocharger, which comprises a turbine having a turbine housing. The turbine housing has a first flood, a second flood and a third flood, wherein the first exhaust gas line element opens out into the first flood and the second exhaust gas line element into the second flood. Exhaust gas from the combustion chambers can flow through the third flood. Moreover, the turbine comprises a turbine wheel that is rotatably received in the turbine housing and can be driven by the exhaust gas. Furthermore, a bypass device is provided, which has at least one bypass line that can be flowed through by exhaust gas form the first and the second exhaust gas line element, via which bypass line the turbine wheel is to bypass at least one part of the exhaust gas from the first and second exhaust gas line element. This means that the exhaust gas flowing through the bypass line bypasses the turbine wheel and thus does not drive the turbine wheel.

Here, the internal combustion engine comprises a valve device, which has a first valve element. An amount of the exhaust gas flowing through the bypass line and bypassing the turbine wheel can be set by means of the first valve element. Furthermore, the valve device has a second valve element. Furthermore, the internal combustion engine comprises a third exhaust gas line element, which opens out into the third flood.

Furthermore, DE 10 2008 020 405 A1 discloses an exhaust gas turbocharger for a combustion engine of a motor vehicle. A turbine for an exhaust gas turbocharger is known from DE 10 2013 002 894 A1. Moreover, DE 101 52 803 A1 discloses a combustion engine having an exhaust gas turbocharger.

The object of the present invention is to further develop an internal combustion engine and a motor vehicle of the kind mentioned at the start that can achieve a particularly advantageous operation.

In order to further develop an internal combustion engine of the kind specified herein in such a way that a particularly advantageous operation can be achieved, it is provided according to the invention that the second valve element is fluidically connected to the first exhaust gas line element and fluidically to the second exhaust gas line element and has at least one main flood connection, via which the first exhaust gas line element and the second exhaust gas line element can be fluidically connected to each other in the second valve element. Furthermore, the second valve element can be switched between a first state, a second state, a third state and a fourth state. In the first state, the third exhaust gas line element is fluidically connected to the first exhaust gas line element and the second exhaust gas line element via the second valve element, whereby exhaust gas can flow out of the first and second exhaust gas line element via the second valve element into the third exhaust gas line element, such that, in the first state, the third exhaust gas line element can be supplied with exhaust gas from the first and second exhaust gas line element via the valve element. Moreover, the main flood connection is closed in the first state, such that the first exhaust gas line element and the second exhaust gas line element are separated from each other at least inside the second valve element.

The first flood and the second flood are also referred to as main floods, wherein the third flood is referred to as the auxiliary flood, for example. Since, in the first state, the main flood connection is closed, there is no flood connection of the main floods in the first state, since the first exhaust gas line element and the second exhaust gas line element and thus the main floods are separated from each other at least in the second valve element. In doing so, a pulse charging of the internal combustion engine, for example, can be caused. Furthermore, at least one first part of the exhaust gas flowing through the first exhaust gas line element of the first flood can flow out of the first exhaust gas line element and flow into the third exhaust gas line element via the second valve element and thus into the third flood (auxiliary flood), such that at least the first part of the exhaust gas branches out of the first exhaust gas line element or out of the first flood, which is also referred to as the first main flood, and supplied to the auxiliary flood. Furthermore, at least one second part of the exhaust gas flowing through the second exhaust gas line element or the second flood can flow out of the second exhaust gas line element and flow into the third exhaust gas line element via the second valve element and thus into the third flood (auxiliary flood), such that at least the second part of the exhaust gas branches out of the second exhaust gas line element or out of the second flood, which is also referred to as the second main flood, and is supplied to the auxiliary flood. However, here, a flood separation of the main floods is provided, since the main flood connection is closed by means of the second valve element and thus fluidically blocked.

In the second state, the main flood connection is closed, whereby the pulse charging mentioned before can be set or is set. Moreover, in the second state, the third exhaust gas line element and thus the auxiliary flood is separated from the first exhaust gas line element and from the second exhaust gas line element and thus from the main floods by means of the second valve element. As described above, in the first state, for example, the auxiliary flood is supplied with exhaust gas from the main floods, wherein the main floods, for example, and the auxiliary flood are flowed through by exhaust gas. However, in the second operating state, there is no supply to the auxiliary flood, in particular with exhaust gas from the first and second exhaust gas line element or with exhaust gas from the main floods, such that, in the second state, for example, the auxiliary flood is deactivated or switched off. However, in the first state, the auxiliary flood is switched on or activated.

In the third state, the third exhaust gas line element is separated from the first exhaust gas line element and from the second exhaust gas line element by means of the second valve element, such that, in the third operating state, the auxiliary flood (third flood) is deactivated or switched off. Like in the second state, in the third state, no exhaust gas is branched off from the first and second exhaust gas line element supplied to the third flood or the third exhaust gas line element. However, in the third state, the main flood connection is released, such that the first exhaust gas line element and the second exhaust gas line element are fluidically connected to each other via the second valve element, in particular in the second valve element. As a result, the main floods are fluidically connected to one another in the third state, such that, in the third state, a flood connection of the main floods is provided. In doing so, a congestion charging of the internal combustion engine, for example, can be achieved, in particular while the third flood is switched off.

In the fourth state, the third exhaust gas line element is fluidically connected to the first exhaust gas line element and to the second exhaust gas line element via the second valve element and thus can be supplied with exhaust gas from the first exhaust gas line element and from the second exhaust gas line element. Thus, in the fourth state, the auxiliary flood is switched on, since exhaust gas from the first and second exhaust gas line element or from the main floods is supplied to the auxiliary flood. Moreover, in the fourth state, the main flood connection is released, such that the first and second exhaust gas line elements are fluidically connected to each other via the second valve element, in particular in the second valve element. This means that, in the fourth state, a flood connection of the main floods is provided, whereby the congestion charging mentioned above, for example, can be set or is set, in particular while the third flood is switched on.

The following knowledge underlies the invention, in particular: in the meantime, exhaust gas turbochargers whose turbines are supplied with several floods and here, generally, two floods, belong to the prior art in the field of internal combustion engines, which are also called combustion motors. The respective combustion motor here has combustion chambers, for example, which are also referred to as cylinders. A first part of the cylinder conveys exhaust gases into a first flood, wherein a second part of the cylinder conveys exhaust gas into a second flood of the respective turbine. In doing so, a flood separation can be achieved, whereby a reduction of volumes guiding exhaust gas or flow cross-sections per flood can be achieved. As a result, the pulse charging mentioned above or a pulse charging operation of the turbines can be achieved. Usually, a bypass device, also referred to as a waste gate, is provided for controlling such a pulse-charged exhaust gas turbocharger. In doing so, it is possible to conduct the exhaust gas from the two floods specifically past the turbine wheel. Along with advantages with non-stationary engine operation, the engine moment with low rotational speeds can also be increased by using a multi-flood turbine, such that, even with low rotational speeds, high torsional moments can be obtained, which can be provided by the combustion motor. These advantages are obtained, among other things, by means of the low volumes or flow cross-sections per flood. If the combustion motor is operated with high engine rotational speeds, the small volumes or flow cross-sections nevertheless lead to the disadvantage that the pressure increases significantly before the turbine. As a result, the alternation of load and consequently also the degree of effectiveness of the combustion motor deteriorate. In order to solve this conflict of objects, an additional setting body, in particular in the form of a valve, can be used, wherein this setting body causes a connection of the floods otherwise separated from one another in the event of high engine rotational speeds. Thus, a greater flow cross-section per flood is available for the effluent exhaust gas, whereby the pressure is reduced before the turbine.

In principle, two solutions are possible for achieving the flood connection: In addition to the valve of the bypass device, also referred to as the blow-off valve, a setting body can be used for the flood connection, such that two setting bodies and thus two valves and two actuators are provided. Furthermore, it is possible to achieve the functions of the bypass of the turbine wheel and the flood connection with the aid of exactly one setting body, whereby a combination solution is provided. Bypassing the turbine wheel is also referred to as blowing off or releasing. In order to use the advantages of the flood connection, two setting bodies are thus provided, for example. However, the disadvantage of the combination solution is that it is only possible to a limited extent or is not possible to separate the functions of the blowing-off of the flood connection from one another. In comparison to conventional solutions having two setting bodies, i.e., in comparison to the combination solution, it is possible with the internal combustion engine according to the invention to design the two main floods to be smaller, i.e., with smaller flow cross-sections or volumes. In doing so, a degree of freedom technical for the design can be created, by means of which advantages can be achieved in certain fields of engine operation, such as non-stationary operation, for example, and the provision of high torsional moments with low motor rotational speeds. Here, however, there are no disadvantages to be expected in operating fields with high motor rotational speeds. With the internal combustion engine according to the invention, it is thus possible to separate the functions of the flood connection and the blowing-off by the valve elements, such that a particularly advantageous operation in line with demand can be achieved: Moreover, it is possible to also influence the size of the turbine, in particular its expansion, in addition to the function of the flood connection. In particular, in comparison to the combination solution, it is possible with the internal combustion engine according to the invention to control the functions of the blowing-off of the flood connection independently of one another. Thus, a function separation of the functions blowing-off and flood connection can be guaranteed. As a result, a particularly efficient and thus economical operation can be achieved, such that the consumption of energy or fuel, for example, of the internal combustion engine can be maintained in a particularly small frame.

In an advantageous embodiment of the invention, the first valve element has a first valve part for setting the amount of exhaust gas and a first setting member, by means of which the first valve part can be moved for setting the amount. In doing so, the amount of the exhaust gas flowing through the bypass line can be set particularly in line with demand, whereby a particularly advantageous operation can be achieved.

A further embodiment is characterised in that the second valve element has at least one second valve part, which is formed separately from the first valve part and is provided in addition to the first valve part and can be moved relative to the first valve part, for example, and a second setting member provided in addition to the first setting member, by means of which second setting member the second valve part can be moved, in particular relative to the first valve part, for switching the second valve element. In doing so, the function separation mentioned above can be created, such that the first valve part, for example, can be moved, while there is no movement of the second valve part and/or vice versa. Thus, the flood connection can be set, for example, while there is no setting or adjustment of the amount of exhaust gas flowing though the bypass line. As a result, an operation particularly in line with demand can be depicted.

In a further embodiment of the invention, the second valve part can be pivoted around a pivoting axis, whereby the flood connection and the amount of the exhaust gas flowing though the bypass line can be set particularly advantageously.

In a further embodiment of the invention, the second valve element has a first valve region having two channels and a separating wall, wherein, in the first state, a first of the channels is fluidically connected to the first exhaust gas line element and the second channel is fluidically connected to the second exhaust gas line element. Here, the channels are fluidically connected to the third exhaust gas line element, and the main flood connection is closed by means of the separating wall separating the channels from one another.

In a further advantageous embodiment of the invention, the second valve element has a second valve region, by means of which, in the second state, the main flood connection is closed, i.e., fluidically blocked, and the third exhaust gas line element is separated from the first and second exhaust gas line element.

It has furthermore been shown to be particularly advantageous when the second valve element has a third valve region, by means of which, in the third state, the main flood connection is released via a connection channel, and the third exhaust gas line element is separated from the first and second exhaust gas line element.

A further embodiment is characterised in that the second valve element has a fourth valve region having two further channels, wherein, in the fourth state, a first of the further channels is fluidically connected to the first exhaust gas line element, the second further channel is fluidically connected to the second exhaust gas line element, and the further channels are fluidically connected to one another via the main flood connection by means of a connection channel. Furthermore, in the fourth state, the further channels are fluidically connected to the third exhaust gas line element.

At least one of the valve regions is formed, for example, by the second valve part mentioned above, wherein the different states can be set in a particularly simple manner in line with demand by means of the valve regions. As a result, a particularly efficient and effective operation can be depicted.

Here, finally, it has been shown to be particularly advantageous when the valve regions can be moved, in particular translationally, in particular relative to a housing of the second valve element, whereby the second valve element can be switched between the states.

A motor vehicle having an internal combustion engine according to the invention also belongs to the invention. Here, advantages and advantageous embodiments of the internal combustion engine according to the invention can be seen as advantages and advantageous embodiments of the motor vehicle according to the invention, and vice versa.

Further advantages, features and details of the invention result from the description of preferred exemplary embodiments below, as well as by means of the drawing. The features and feature combinations referred to in the description as well as the features and feature combinations referred to below in the description of the Figures and/or shown solely in the Figures can be used not only each specified combination but also in other combinations or alone without leaving the scope of the invention.

DETAILED DESCRIPTION OF THE DRAWINGS

In the Figures, the same or functionally identical elements are provided with the same reference numerals.

Figure 1:
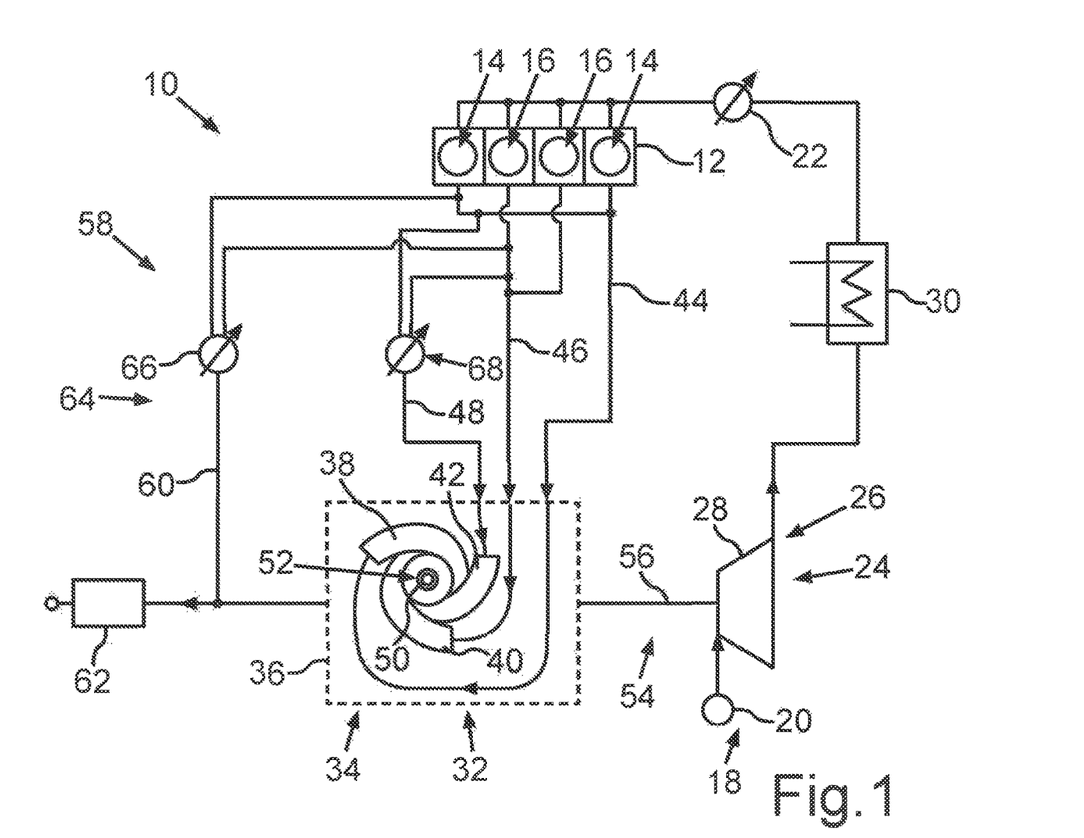
FIG. 1 is a schematic depiction of an internal combustion engine according to the invention.

FIG. 1 shows, in a schematic depiction, an internal combustion engine 10 for a motor vehicle, in particular for a car such as a passenger motor vehicle, for example. The internal combustion engine 10 has a motor housing 12 formed, for example, as a cylinder housing, in particular as a cylinder crankcase, by means of which combustion chambers in the form of cylinders 14 and 16 are formed. The cylinders 14 belong to a first group or form a first group of cylinders, which the cylinders 16 belong to a second group of cylinders or form a second group of cylinders. The first group is also referred to as the first part, while the second group is also referred to as the second part of the cylinders 14 and 16.

The internal combustion engine 10 has a suction pipe 18 that can be at least flowed through by air, by means of which the air flowing through the suction pipe 18 is guided to, in particular into, the cylinders 14 and 16. Here, the air filter 20 is arranged in the suction pipe 18 for filtering air. Moreover, a valve device formed, for example, as a throttle valve 22, is arranged in the suction pipe 18, by means of which valve device an amount of the air flowing through the suction pipe 18, the amount flowing into the cylinders 14 and 16, can be set.

The internal combustion engine 10 furthermore has at least one exhaust gas turbocharger 24, which has a compressor 26 arranged in the suction pipe 18 having at least one compressor wheel 28. The air flowing through the suction pipe 18 is compressed by means of the compressor wheel 28. In doing so, the air is heated. In order to achieve a particularly high degree of charging, a charging air cooler 30 is arranged in the suction pipe 18 downstream of the compressor 26, by means of which charging air cooler the compressed and thus heated air is cooled before the compressed air flows into the cylinders 14 and 16.

In a fueled operation of the internal combustion engine 10, the air and a particularly fluid fuel is supplied to the cylinders 14 and 16, the filet being injected directly into the cylinders 14 and 16, for example. In doing so, in the respective cylinder 14 or 16, a fuel-air mixture emerges, which is ignited, in particular by extraneous ignition and thus burned. This results in the exhaust gas of the internal combustion engine 10, which has an exhaust gas section 32 that exhaust gas can flow through. The exhaust gas is conducted away from the cylinders 14 and 16 by means of the exhaust gas section 32. The exhaust gas turbocharger 24 here has a turbine 34 arranged in the exhaust gas section 32 having a turbine housing 36. The turbine housing 36 has a first flood 38, a second flood 40 and a third flood 42, wherein the floods 38 and 40 are main floods of the turbine 34. The flood 42 is an auxiliary flood of the turbine 34.

It can be seen in FIG. 1 that the exhaust gas section 32 has a first exhaust gas line element 44 allocated to the first flood 38 and opens out into the first flood 38 and is here fluidically connected to the first flood 38. Moreover, the exhaust gas section 32 comprises a second exhaust gas line element 46, which is allocated to the second flood 40 and here opens out into the second flood 40 and is fluidically connected to the second flood 40. Moreover, a third exhaust gas line element 48 of the exhaust gas section 32 is provided, wherein the third exhaust gas line element 48 is allocated to the third flood 42 and here opens out into the third flood 42 and is fluidically connected to the third flood 42. The exhaust gas line elements 44, 46 and 48 are also referred to as flood or exhaust gas floods.

The turbine housing 36 has a receiving chamber 52 into which the floods 38, 40 and 42 open out. The floods 38, 40 and 42 can be flowed through by exhaust gas and serve to conduct exhaust gas flowing through the floods 38, 40 and 42 into the receiving chamber 52. Here, the turbine 34 has a turbine wheel, which is arranged rotatably in the receiving chamber 52. Thus, the turbine wheel 50 can be rotated around an axis of rotation relative to the turbine housing 36. The exhaust gas introduced into the receiving chamber 52 via the floods 38, 40 and 42 can flow into and thus drive the turbine wheel 50, whereby the turbine wheel 50 is rotated around the axis of rotation. Here, the floods 38, 40 and 42 are spiral channels, which extend substantially helically in the peripheral direction of the turbine wheel 50 across its periphery.

The turbine wheel 50 and the compressor wheel 28 are components of a rotor 54 of the exhaust gas turbocharger 24. Here, the rotor 54 also comprises a shaft 56, which is non-rotationally connected to the compressor wheel 28 and to the turbine wheel 50. As a result of the turbine wheel 50 being driven by exhaust gas, the compressor wheel 28 is driven via the shaft 56 of the turbine wheel 50. In doing so, the air flowing through the suction pipe 18 is compressed by means of the compressor wheel 28, whereby energy contained in the exhaust gas is used for compressing the air.

Furthermore, the internal combustion engine 10 has a bypass device 58, which has at least one bypass line 60. The turbine wheel 50 is to be bypassed by at least one part of the exhaust gas from the combustion chambers (cylinders 14 and 16) via the bypass line 60. This means that the exhaust gas flowing through the bypass line 60 does not drive the turbine wheel 50 but is conducted past the turbine wheel 50. Here, the bypass line 60 is fluidically connected to the exhaust gas section 32 at at least one first connection point and at least one second connection point, wherein the first connection point is arranged upstream of the turbine wheel 50 and the second connection point is arranged downstream of the turbine wheel 50.

Furthermore, at least one exhaust gas post-treatment device 62 is arranged in the exhaust gas section 32, by means of which device the exhaust gas can be post-treated. Here, the exhaust gas post-treatment device 62 is arranged downstream of the second connection point. Moreover, the internal combustion engine 10 comprises a valve device 64, which has a first valve element 66 and a second valve element 68. The respective valve element 66 or 68 is also referred to as setting body. The first valve element 66 is also referred to as a waste gate, since it is used to set an amount of the exhaust gas flowing through the bypass line 60 and thus bypassing the turbine wheel 50. This bypassing of the turbine wheel 50 is also referred to as blowing-off or releasing, such that the bypass line 60 and the waste gate are used for blowing off.

As can be seen in FIG. 1, the bypass line 60 is fluidically connected to the exhaust gas line elements 44 and 46 via the first valve element 66, such that exhaust gas from at least one of the cylinders 16 and exhaust gas from at least one of the cylinders 14, for example, can flow into the bypass line 60 via the valve element 66. Thus, the amount of exhaust gas flowing through the bypass line 60 from the exhaust gas line elements 44 and 46 can be set by means of the first valve element 66.

During the fueled operation of the internal combustion engine 10, the cylinders 14 convey their exhaust gas into the exhaust gas line element 44 yet not into the exhaust gas line element 46, such that the cylinders 14 are guided together to the exhaust gas line element 44. During the fueled operation, the cylinders 16 convey their exhaust gas into the exhaust gas line element 46 yet not into the exhaust gas line element 44, such that the cylinders 16 are guided together to the exhaust gas line element 46. Here, at least one part of the exhaust gas from at least one of the cylinders 14 and at least one part of the exhaust gas from at least one of the cylinders 16 can be branched off and led into the bypass line 60 via the first valve element 66, such that the exhaust gas flowing through the bypass line 60 comes, for example, from both at least one of the cylinders 14 and from at least one of the cylinders 16.

In order to now be able to achieve a particularly advantageous operation, the second valve element 68 is fluidically connected to the exhaust gas line elements 44 and 46. Moreover, the second valve element 68, as can be seen particularly well when viewed together with FIG. 2, has at least one main flood connection 70, via which the exhaust gas line elements 44 and 46 and thus the main floods, for example, can be fluidically connected to one another. As can also be seen particularly well when viewed together with FIG. 2, the second valve element 68 can be switched between a first state, a second state, a third state and a fourth state. In the first state, the third exhaust gas line element 48 is fluidically connected to the exhaust gas line elements 44 and 46 via the second valve element 68 and thus can be provided with exhaust gas from the exhaust gas line elements 44 and 46, while the main flood connection 70 is closed or blocked. In doing so, at least one respective part of the exhaust gas flowing through the respective exhaust gas line elements 44 and 46, for example, from the exhaust gas line elements 44 and 46 is branched off and guided into the third exhaust gas line element 48 or auxiliary flood via the second valve element 68. Here, a flood connection of the main floods is separated or interrupted, since the main flood connection 70 is blocked, in doing so, a pulse charging or a pulse charging operation, for example, can be depicted. In the second state, the main flood connection 70 is closed, and the third exhaust gas line element 48 is separated from the exhaust gas line elements 44 and 46 by means of the second valve element 68. Thus, if, in the first state, the auxiliary flood is switched on or activated, in the second state, the auxiliary flood is deactivated or switched off. Both in the first state and in the second state, a flood connection of the main floods is interrupted.

Figure 2:
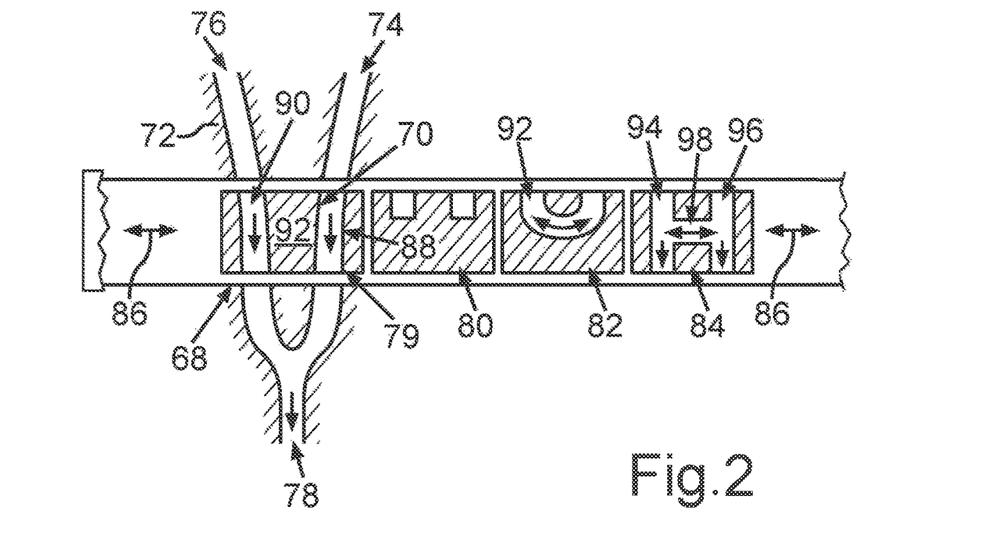
FIG. 2 shows, in sections, a schematic sectional view of a valve element of the internal combustion engine according to a first embodiment.

In the third state, the third exhaust gas line element 48 is separated from the exhaust gas line elements 44 and 46 by means of the second valve element 68, whereby the auxiliary flood is switched off. However, the main flood connection 70 released, such that the exhaust gas line elements 44 and 46 are fluidically connected to one another via the second valve element 68. Thus, in the third state, a flood connection of the main flood is activated or set, such that a congestion charging or congestion charging operation, for example, can be achieved.

In the fourth state, the third exhaust gas line element 48 is fluidically connected to the exhaust gas line elements 44 and 46 via the second valve element 68 and thus can be supplied with exhaust gas from the exhaust gas line element 44 and 46, while the main flood connection 70 is released, such that the exhaust gas line elements 44 and 46 are fluidically connected to one another via the second valve element 68, in particular in the valve element 68. Thus, the flood connection of the main floods in the fourth state is set or activated.

FIG. 2 shows a first embodiment of the second valve element 68. The second valve element 68 has a valve housing 72, for example, having a first port 74, a second port 76 and a third port 78. The valve element 68 is fluidically connected to the exhaust gas line element 44, for example, and thus to the first flood 38 via the port 74, the flood also being referred to as the main flood. The valve element 68 is fluidically connected to the exhaust gas line element 46 and thus to the second flood 40 via the port 76, the flood also being referred to as the second main flood. The valve element 68 is fluidically connected to the third exhaust gas line element 48 and thus to the auxiliary flood, for example, via the port 78.

Here, the valve element 68 has four valve regions 79, 80, 82 and 84, which are, for example, respective valve parts of the valve element 68. The valve regions 79, 80, 82 and 84 can be moved translationally, in particular relative to the valve housing 72, in order to thus switch the valve element 68 between the four states. Here, in FIG. 2, dual arrows 86 illustrate the movement or the moveability of the valve regions 79, 80, 82 and 84 relative to the valve housing 72. The valve regions 79, 80, 82 and 84 are thus used to achieve four states of the valve element 68. Here, the valve parts of the valve element 68 are formed separately, for example, from a valve part of the valve element 66 and are provided in addition to the valve part of the valve element 66, wherein the valve part of the valve element 66 is also referred to as a further valve part. The amount of exhaust gas flowing through the bypass line 60 can be set by means of the further valve part, for example. Here, the valve element 66 has a first actuator, for example, which is also referred to as the first setting member. The further valve part can be moved by means of the first actuator in order to thus set the amount of the exhaust gas flowing through the bypass line 60. The valve element 68 has a second actuator, for example, which is also referred to as the second setting member. Here, the valve parts of the valve element 68 can be moved, for example, by means of the second actuator, in order to thus be able to switch the valve element 68 between the states. In particular, it is possible to control the actuators of the valve elements 66 and 68 separately or independently of one another, such that the valve parts of the valve elements 66 and 68, for example, can be moved relative to one another. This is to be understood to mean, in particular, that the valve regions 79, 80, 82 and 84 of the valve element 68 can be moved, while there is no movement of a further valve part of the valve element 68 and/or vice versa. Thus, a function separation can be depicted, in the scope of which the functions of the flood separation or flood connection and the blowing off can be held separately or can be carried out separately from one another. In the first embodiment shown in 2, the valve parts of the valve element 68 can be moved or shifted translationally, in particular in relation to the valve housing 72, whereby the second valve element 68 can be switched between the states.

Here, the first valve region 79 has two channels 88 and 90 and a separating wall 92 separating the channels 88 and 90 from one another and arranged between the channels 88 and 90. In the first state, the channel 88 is fluidically connected to the exhaust gas line element 44 via the port 74, and the second channel 90 is fluidically connected to the exhaust gas line element 46 via the port 76. Furthermore, the channels 88 and 90 are fluidically connected to the exhaust gas line element 48 via the port 78. The exhaust gas from the exhaust gas line elements 44 and 46 can thus flow into the channels 88 and 90 via the ports 74 and 76, flow through the channels 88 and 90 and, from the channels 88 and 90, flow into the exhaust gas line element 48 and flow further into the auxiliary flood and flow through the auxiliary flood. Furthermore, in the first state, the main flood connection 70 is closed and thus fluidically blocked by means of the separating wall 92 separating the channels 88 and 90 from each other.

In the second state, the main flood connection 70 is fluidically blocked by means of the valve region 80, and the exhaust gas line element 48 is separated from the exhaust gas line elements 44 and 46 by means of the valve regions 80.

In the third state, the main flood connection 70 is released by means of the third valve region 82, such that the exhaust gas line elements 44 and 46 and thus the main floods are fluidically connected to one another via the main flood connection 70 by means of a connection channel 92. Here, in the third state, the third exhaust gas line element 48 is separated from the exhaust gas line elements 44 and 46 by means of the third valve region 82.

The fourth valve region 84 has two further channels 94 and 96, which are fluidically connected to each other via a connection channel 98 of the valve region 84. In the fourth state, the further channel 94 is fluidically connected to the exhaust gas line element 44, while the further channel 96 is fluidically connected to the exhaust gas line element 46. Furthermore, in the fourth state, the further channels 94 and 96 are fluidically connected to one another via the main flood connection 70, since, in the fourth state, for example, the connection channel 98 is arranged in the main flood connection 70. Moreover, in the fourth state, the further channels 94 and 96 are fluidically connected to the third exhaust gas line element 58, such that, in the fourth state, the exhaust gas line element 48 is connected to the exhaust gas line elements 44 and 46 via the further channels 94 and 96. Here, in FIG. 2, arrows not provided with reference numerals illustrate the exhaust gas flowing through the respective valve region 79, 80, 82 and 84.

Figure 3:
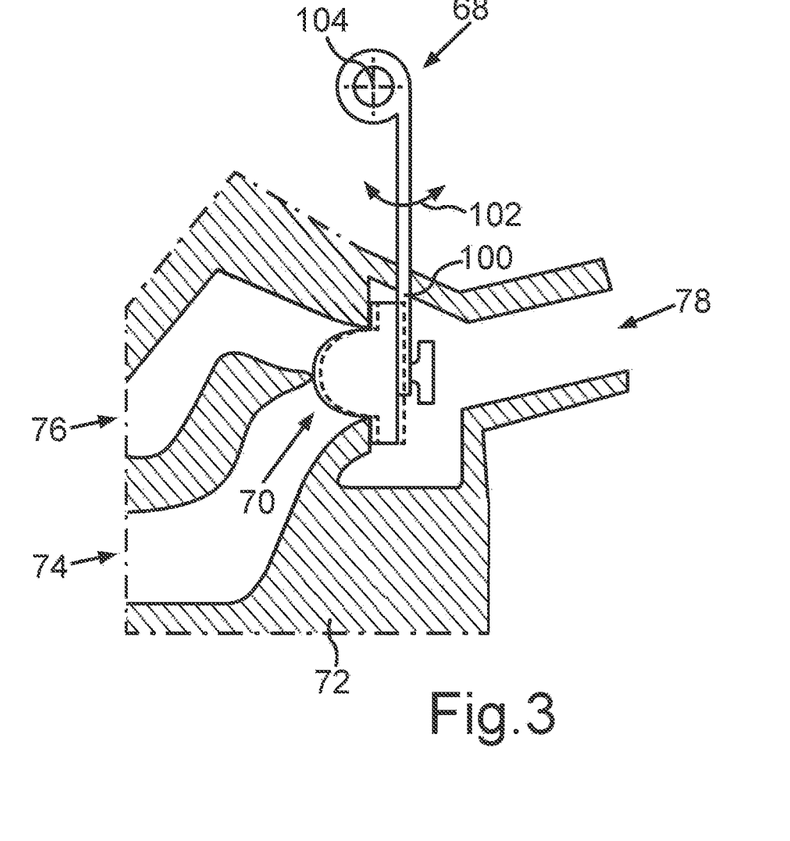
FIG. 3 shows, in sections, a schematic sectional view of the valve element according to a second embodiment.

FIG. 3 shows a second embodiment of the second valve element 68. Here, the valve element 68 has at least one valve part 100, which—as illustrated in FIG. 3 by a dual arrow 102—can be pivoted around a pivoting axis 104 relative to the valve housing 72. FIG. 3 shows, for example, a closed position of the valve part 100, wherein, in the closed position, the main flood connection 70 is fluidically blocked by means of the valve part 100. Furthermore, in the closed position, the port 78 is separated from the ports 74 and 76 by means of the valve part 100, such that the exhaust gas line element 48 is fluidically separated from the exhaust gas line elements 44 and 46. The valve part 100 can be pivoted, for example, between the closed position and at least one open position relative to the valve housing 72, wherein the at least one open position is illustrated by doubled lines in FIG. 3. In the open position, the valve part 100 releases, for example, both the main flood connection 70 and a fluid connection of the port 78 to the ports 74 and 76, such that, in the at least one open position, for example both the main flood connection 70 is released and the exhaust gas line element 48 is fluidically connected to the exhaust gas line elements 44 and 46.

In comparison to conventional internal combustion engines, it is possible to design the main flood to be particularly small, whereby a particularly advantageous pulse charging operation can be depicted. Furthermore, in line with demand, it can be switched between the pulsed charging operation and the congestion charging operation. Furthermore, the function separation mentioned above can be achieved, such that a particularly advantageous operation can be achieved.

LIST OF REFERENCE CHARACTERS

10 Internal combustion engine
12 Motor housing
14 Cylinder
16 Cylinder
18 Suction pipe
20 Air filter
22 Throttle valve
24 Exhaust gas turbocharger
26 Compressor
28 Compressor wheel
30 Charge air cooler
32 Exhaust gas section
34 Turbine
36 Turbine housing
38 First flood
40 Second flood
42 Third flood
44 First exhaust gas line element
46 Second exhaust gas line element
48 Third exhaust gas line element
50 Turbine wheel
52 Receiving chamber
54 Rotor
56 Shaft
58 Bypass device
60 Bypass line
62 Exhaust gas post-treatment device
64 Valve device
66 First valve element
68 Second valve element
70 Overflow opening
72 Valve housing
74 Port
76 Port
78 Port
79 First valve region
80 Second valve region
82 Third valve region
84 Fourth valve region
86 Dual arrow
88 Channel
90 Channel
92 Connection channel
94 Further channel
96 Further channel
98 Connection channel
100 Valve part
102 Dual arrow
104 Pivot axis

The invention claimed is:

1. An internal combustion engine (10) for a motor vehicle, comprising:
 a first combustion chamber (14);
 a second combustion chamber (16);
 a first exhaust gas line (44) through which exhaust gas from the first combustion chamber (14) is flowable;
 a second exhaust gas line (46) through which exhaust gas from the second combustion chamber (16) is flowable;
 an exhaust gas turbocharger (24), wherein the exhaust gas turbocharger includes:
  a turbine (34) having a turbine housing (36);
  a first flood (38) into which the first exhaust gas line (44) opens out;
  a second flood (40) into which the second exhaust gas line (46) opens out;
  a third flood (42) through which exhaust gas from the first and second combustion chambers (14, 16) is flowable; and
  a turbine wheel (50) received rotatably in the turbine housing (36);
 a bypass device (58) which has a bypass line (60) through which exhaust gas from the first exhaust gas line and the second exhaust gas line (44, 46) is flowable and via the bypass line (60) the turbine wheel (50) is bypassed by a first part of the exhaust gas from the first exhaust gas line and the second exhaust gas line (44, 46);
 a valve device (64) which includes a first valve element (66) via which an amount of the exhaust gas flowing through the bypass line (60) and bypassing the turbine wheel (50) from the first exhaust gas line and the second exhaust gas line (44, 46) is settable;
 a third exhaust gas line (48) which opens out into the third flood (42); and
 a second valve element (68) that is fluidically connected to the first exhaust gas line and the second exhaust gas line (44, 46), has a main flood connection (70) via which the first exhaust gas line and the second exhaust gas line (44, 46) in the second valve element (68) are fluidically connectable to each other, and that is switchable between:
  a first state, in which the third exhaust gas line (48) is fluidically connected to the first exhaust gas line and the second exhaust gas line (44, 46) via the second valve element (68) and thus is provided with exhaust gas from the first exhaust gas line and the second exhaust gas line (44, 46), while the main flood connection (70) is closed by the second valve element (68);
  a second state, in which the main flood connection (70) is closed and the third exhaust gas line (48) is separated from the first exhaust gas line and the second exhaust gas line (44, 46) by the second valve element (68);
  a third state, in which the third exhaust gas line (48) is separated from the first exhaust gas line and the second exhaust gas line (44, 46) by the second valve element (68), and the main flood connection (70) is released, such that the first exhaust gas line and the second exhaust gas line (44, 46) are fluidically connected to each other via the second valve element (68); and
  a fourth state, in which the third exhaust gas line (48) is fluidically connected to the first exhaust gas line and the second exhaust gas line (44, 46) via the second valve element (68) and thus is provided with exhaust gas from the first exhaust gas line and the second exhaust gas line (44, 46), and the main flood connection (70) is released, such that the first exhaust gas line and the second exhaust gas line (44, 46) are fluidically connected to each other via the second valve element (68); wherein
 the first valve element (66) has a first valve part for setting the amount of the exhaust gas, the first valve part being movable for setting the amount of the exhaust gas; and the second valve element (68) has a second valve part formed separately from the first valve part, the second valve part being movable for switching the second valve element (68).

2. The internal combustion engine (10) according to claim 1, wherein the second valve part is pivotable around a picoting axis.

3. An internal combustion engine (10) for a motor vehicle, comprising:
  a first combustion chamber (14);
  a second combustion chamber (16);
  a first exhaust gas line (44) through which exhaust gas from the first combustion chamber (14) is flowable;
  a second exhaust gas line (46) through which exhaust gas from the second combustion chamber (16) is flowable;
  an exhaust gas turbocharger (24), wherein the exhaust gas turbocharger includes:
    a turbine (34) having a turbine housing (36);
    a first flood (38) into which the first exhaust gas line (44) opens out;
    a second flood (40) into which the second exhaust gas line (46) opens out;
    a third flood (42) through which exhaust gas from the first and second combustion chambers (14, 16) is flowable; and
    a turbine wheel (50) received rotatably in the turbine housing (36);
  a bypass device (58) which has a bypass line (60) through which exhaust gas from the first exhaust gas line and the second exhaust gas line (44, 46) is flowable and via the bypass line (60) the turbine wheel (50) is bypassed by a first part of the exhaust gas from the first exhaust gas line and the second exhaust gas line (44, 46);
  a valve device (64) which includes a first valve element (66) via which an amount of the exhaust gas flowing through the bypass line (60) and bypassing the turbine wheel (50) from the first exhaust gas line and the second exhaust gas line (44, 46) is settable;
  a third exhaust gas line (48) which opens out into the third flood (42); and
  a second valve element (68) that is fluidically connected to the first exhaust gas line and the second exhaust gas line (44, 46), has a main flood connection (70) via which the first exhaust gas line and the second exhaust gas line (44, 46) in the second valve element (68) are fluidically connectable to each other, and that is switchable between:
    a first state, in which the third exhaust gas line (48) is fluidically connected to the first exhaust gas line and the second exhaust gas line (44, 46) via the second valve element (68) and thus is provided with exhaust gas from the first exhaust gas line and the second exhaust gas line (44, 46), while the main flood connection (70) is closed by the second valve element (68);
    a second state, in which the main flood connection (70) is closed and the third exhaust gas line (48) is separated from the first exhaust gas line and the second exhaust gas line (44, 46) by the second valve element (68);
    a third state, in which the third exhaust gas line (48) is separated from the first exhaust gas line and the second exhaust gas line (44, 46) by the second valve element (68), and the main flood connection (70) is released, such that the first exhaust gas line and the second exhaust gas line (44, 46) are fluidically connected to each other via the second valve element (68); and
    a fourth state, in which the third exhaust gas line (48) is fluidically connected to the first exhaust gas line and the second exhaust gas line (44, 46) via the second valve element (68) and thus is provided with exhaust gas from the first exhaust gas line and the second exhaust gas line (44, 46), and the main flood connection (70) is released, such that the first exhaust gas line and the second exhaust gas line (44, 46) are fluidically connected to each other via the second valve element (68); wherein
  the second valve element (68) has a first valve region (79) with a first channel (88), a second channel (90), and a separating wall (92), wherein in the first state:
    the first channel (88) is fluidically connected to the first exhaust gas line (44);
    the second channel (90) is fluidically connected to the second exhaust gas line (46);
    the first channel and the second channel (88, 90) are fluidically connected to the third exhaust gas line element (48); and
    the main flood connection (70) is closed by the separating wall (92).

4. The internal combustion engine (10) according to claim 3, wherein the second valve part (68) has a second valve region (80) via which, in the second state, the main flood connection (70) is closed and the third exhaust gas line (48) is separated from the first exhaust gas line and the second exhaust gas line (44, 46).

5. The internal combustion engine (10) according to claim 4, wherein the second valve element (68) has a third valve region (82) via which, in the third state, the main flood connection (70) is released and the first exhaust gas line and the second exhaust gas line (44, 46) are fluidically connected to each via a connection channel (92) and the third exhaust gas line (48) is separated from the first exhaust gas line and the second exhaust gas line (44, 46).

6. The internal combustion engine (10) according to claim 5, wherein the second valve element (68) has a fourth valve region (84) with a third channel (94) and a fourth channel (96), wherein in the fourth state:
  the third channel (94) is fluidically connected to the first exhaust gas line element (44);
  the fourth channel (96) is fluidically connected to the second exhaust gas line element (46);
  the third channel and the fourth channel (94, 96) are fluidically connected to one another via the main flood connection (70) via a connection channel (98); and
  the third channel and the fourth channel (94, 96) are fluidically connected to the third exhaust gas line (48).

7. The internal combustion engine (10) according to claim 6, wherein the first, second, third, and fourth valve regions (79, 80, 82, 84) are movable translationally such that the second valve element (58) is switchable among the at least one of the first state, the second state, the third state, and the fourth state.

* * * * *